US011444971B2

(12) United States Patent
Speziale et al.

(10) Patent No.: US 11,444,971 B2
(45) Date of Patent: Sep. 13, 2022

(54) METHOD FOR ASSESSING THE QUALITY OF NETWORK-RELATED INDICATORS OF COMPROMISE

(71) Applicant: Nozomi Networks Sagl, Mendrisio (CH)

(72) Inventors: Ivan Speziale, Forcola (IT);
Alessandro Di Pinto, Malnate (IT);
Moreno Carullo, Gavirate (IT);
Andrea Carcano, San Francisco, CA (US)

(73) Assignee: Nozomi Networks Sagl, Mendrisio (CH)

( * ) Notice: Subject to any disclaimer, the term of this patent is extended or adjusted under 35 U.S.C. 154(b) by 162 days.

(21) Appl. No.: 17/064,010

(22) Filed: Oct. 6, 2020

(65) Prior Publication Data
US 2022/0109688 A1 Apr. 7, 2022

(51) Int. Cl.
*H04L 9/40* (2022.01)
(52) U.S. Cl.
CPC ...... *H04L 63/1433* (2013.01); *H04L 63/1425* (2013.01); *H04L 63/1441* (2013.01); *H04L 63/164* (2013.01); *H04L 63/20* (2013.01)
(58) Field of Classification Search
CPC .............. H04L 63/1433; H04L 63/1425; H04L 63/1441; H04L 63/164; H04L 63/20
USPC .......................................................... 726/22
See application file for complete search history.

(56) References Cited

U.S. PATENT DOCUMENTS

| 7,748,038 B2 * | 6/2010 | Olivier ................. H04L 63/145 713/188 |
| 8,756,691 B2 * | 6/2014 | Nachenberg ............ G06F 21/51 726/22 |
| 9,294,498 B1 * | 3/2016 | Yampolskiy ............ H04L 67/10 |
| 9,749,336 B1 * | 8/2017 | Zhang ................ H04L 63/1416 |
| 2010/0125900 A1 * | 5/2010 | Dennerline ......... H04L 63/0227 726/13 |
| 2012/0117650 A1 * | 5/2012 | Nachenberg .......... G06F 21/562 726/24 |
| 2017/0041333 A1 * | 2/2017 | Mahjoub ............... G06F 16/951 |
| 2017/0374084 A1 * | 12/2017 | Inoue ................. H04L 63/1433 |

* cited by examiner

*Primary Examiner* — Teshome Hailu
(74) *Attorney, Agent, or Firm* — Jason Lee DeFrancesco

(57) ABSTRACT

The present invention relates to a method for assessing the quality of network-related Indicators of Compromise comprising the phase of calculating, by a computerized data processing unit, a quality score for Indicators of Compromise of the IP Address type, the steps of assigning an autonomous system score of the IP Address according to a predefined range of values based on a database of autonomous system owners, assigning a subnet score of said IP Address according to a predefined range of values based on a database of subnet owners, assigning a services hosted score of the IP Address according to a predefined range of values based on known malicious services hosted by the IP Address before the phase of calculating the quality score, calculating the IP Address quality score as sum of the autonomous system score, subnet score and services hosted score and wherein the method comprises a phase of evaluating the calculated quality score comprises, for each of the Indicators of Compromise of the IP Address type, the step of assessing the Indicators of Compromise of the IP Address type as malicious when the IP Address quality score exceed a predefined IP Address quality threshold.

10 Claims, No Drawings

METHOD FOR ASSESSING THE QUALITY OF NETWORK-RELATED INDICATORS OF COMPROMISE

FIELD OF INVENTION

The present invention relates to the field of security methods and security systems in the management of indicators of compromise. In particular, the present invention relates to a method and for assessing the quality of network-related Indicators of Compromise.

BACKGROUND ART

The use of web applications and web services has become an integral part of virtually every aspect in the business process cycle. Besides promoting products and services online, businesses are interacting with customers over the internet and employees are using a growing number of web-based tools for every-day tasks. Web applications have become the most common platform for new software solutions. However, these efficient and cost-effective tools introduce new risks and a need for better or different security measures to compensate for the open, rapid development style that makes the technology increasingly common.

A way to reduce risks in network-related activities involves the activity of monitoring for Indicators of Compromise which enables organizations to better detect and respond to security compromises.

Indicators of compromise, or IoCs are artifacts observed on a network or in an operating system that, with high confidence, indicates a computer intrusion. Typical IoCs are MD5 hashes of malware files, IP Addresses or URLs or domain names of botnet command and control servers. After IoCs have been identified via a process of incident response or computer forensics, they can be used for early detection of future attack attempts using intrusion detection systems and antivirus software. If security teams discover recurrence or patterns of specific IoCs they can update their security tools and policies to protect against future attacks as well. IoCs are an important component in the battle against malware and cyberattacks. While they are reactive in nature, organizations that monitor for IoCs diligently and keep up with the latest IoC discoveries and reporting can improve detection rates and response times significantly.

Currently, there is no common language to describe the capabilities of malware. The hash value of the binary sample only identifies the specimen and little else. Furthermore, polymorphic and metamorphic codes result in multiple hash identities for the same class of malware. There are initiatives to standardize the format of IoCs descriptors for more efficient automated processing, since collecting IoCs means that organizations can have available a collection of high risks whereas collecting and correlating IoCs in real time means that organizations can more quickly identify security incidents that may have gone undetected by other tools and provides the necessary resources to perform forensic analysis of incidents.

There is a push for organizations to report these analyses results in a consistent, well-structured manner to help companies and IT professionals automate the processes used in detecting, preventing, and reporting security incidents. The standardization is yet to come and, anyway, the complex semantics of the IoCs will be subject to personal interpretation.

Moreover, even if some kind of standardization could be used, the main drawback relates to the generation of the IoCs, which is often done automatically or by inexperienced analysts. It would therefore be desirable to have a method capable to assess the quality of network-related Indicators of Compromise. Furthermore, it would be desirable to have a method capable to manage IoCs of different nature devoid of a rigid standardization. Finally, it would be desirable to have a scalable method capable to manage complex query of multiple IoCs.

In particular, it would be desirable to have a method capable to identify false positives that, if not detected, can have serious impacts if deployed into a customer network.

BRIEF DESCRIPTION OF THE INVENTION

The object of the present invention is to provide a method to assess the quality of network-related Indicators of Compromise capable of minimizing the aforementioned drawbacks.

According to the present invention is described, therefore, a method for assessing the quality of network-related Indicators of Compromise as described in the claims.

The method for assessing the quality of network-related Indicators of Compromise comprising the following phases:
 importing, by computerized data processing unit, one or more Indicators of Compromise (IoC);
 classification, by the computerized data processing unit, of each of the Indicators of Compromise as IP Address, Domain Name or URL type;
 storing, in a storage unit of the permanent type operatively connected to the data processing unit, the classified Indicators of Compromise of IP Address, Domain Name or URL type;
 calculating, by the computerized data processing unit, a quality score for each of the classified Indicators of Compromise of the IP Address, Domain Name or URL type;
 storing, in the storage unit of the permanent type, the quality score of each of the classified Indicators of Compromise of the IP Address, Domain Name or URL type;
 evaluating, by the computerized data processing unit, the calculated quality score for each of the classified Indicators of Compromise of the IP Address, Domain Name or URL type;
wherein the phase of calculating the quality score comprises, for each of the Indicators of Compromise of the IP Address type, the following steps:
 assigning an autonomous system score of the IP Address according to a predefined range of values based on a database of autonomous system owners;
 assigning a subnet score of the IP Address according to a predefined range of values based on a database of subnet owners;
 assigning a services hosted score of the IP Address according to a predefined range of values based on known malicious services hosted by the IP Address before the phase of calculating the quality score;
 calculating the IP Address quality score as sum of the autonomous system score, subnet score and services hosted score; and
wherein the phase of evaluating the calculated quality score comprises, for each of the Indicators of Compromise of the IP Address type, the step of assessing the Indicators of Compromise of the IP Address type as malicious when the IP Address quality score exceed a predefined IP Address quality threshold.

The method according to the present invention therefore allows to identify the kind of Indicator of Compromise to be treated and allows a qualification of the same, based on the IP Address quality score, to assess the maliciousness according to a standard threshold.

In an embodiment, the phase of calculating said quality score of the Indicators of Compromise of the IP Address type, further comprises the following steps:
  retrieving the Domain Names hosted by the IP Address;
  assigning a registration data score to each of the retrieved Domain Name according to a predefined range of values based on the registration data;
  assigning an actual service hosted score to each of the retrieved Domain Name according to a predefined range of values based on the rank of the service hosted by the Domain Name;
  assigning a landing page score according to a predefined range of value based on comparison between the landing page of each of the retrieved Domain Name and a database of spoofed web pages;
  calculating a Base Domain Name quality score as sum of the registration data scores, actual service hosted scores and landing page scores; and
wherein the step of calculating said IP Address quality score is performed as sum of said autonomous system score, subnet score, services hosted score and Base Domain Name quality score.

In this way, the IP Address quality score take into account also the quality of the Domain Names hosted by the IP Address.

In an embodiment, the phase of calculating the quality score comprises, for each of the Indicators of Compromise of the Domain Name type, the following steps:
  identifying the IP Address of the Domain Name;
  calculating the IP Address quality score of the identified IP Address as phase of calculating the quality score of the Indicators of Compromise of the IP Address type;
  calculating a weighted IP Address quality score by weighting the IP Address quality score with a predetermined IP Address weight factor;
  assigning a registration data score of the Domain Name according to a predefined range of values based on the registration data;
  assigning an actual service hosted score of the Domain Name according to a predefined range of values based on the rank of the service hosted by the Domain Name;
  assigning a landing page Domain Name score according to a predefined range of value based on comparison between the landing page of the Domain Name and a database of spoofed web pages;
  calculating the Domain Name quality score as sum of the registration data score, actual service hosted score, landing page Domain Name score and of the weighted IP Address quality score; and
wherein the phase of evaluating the calculated quality score comprises, for each of the Indicators of Compromise of the Domain Name type, the step of assessing the Indicators of Compromise of the Domain Name type as malicious when the Domain Name quality score exceed a predefined Domain Name quality threshold.

Therefore, the method according to the present invention allows a qualification of the Indicators of Compromise of the Domain Name type, based on the IP Address identified from the Domain Name itself and already qualified, to assess the maliciousness according to a standard threshold.

In an embodiment, the phase of calculating the quality score comprises, for each of the Indicators of Compromise of the URL type, the following steps:
  identifying the Domain Name of the URL;
  calculating the Domain Name quality score of the identified Domain Name as phase of calculating the quality score of the Indicators of Compromise of the Domain Name type;
  calculating a weighted Domain Name quality score by weighting the Domain Name quality score with a predetermined Domain Name weight factor;
  assigning a landing page URL score according to a predefined range of value based on comparison between the landing page of the URL and a database of spoofed web pages;
  assigning a link score of the URL according to a predefined range of values based on comparison between the collection of outward links from the URL and a database of malware URLs;
  calculating the URL quality score as sum of the landing page URL score, link score and of the weighted Domain Name quality score; and
wherein the phase of evaluating the calculated quality score comprises, for each of the Indicators of Compromise of the URL type, the step of assessing the Indicators of Compromise of the URL type as malicious when the URL quality score exceed a predefined URL quality threshold.

Therefore, the method according to the present invention allows a qualification of the Indicators of Compromise of the URL type, based on the Domain Name identified from the URL itself and already qualified, as well as from the IP Address identified from the same Domain Name, to assess the maliciousness according to a standard threshold.

In an embodiment, the calculated quality score for each of the classified Indicators of Compromise of the IP Address, Domain Name or URL type is stored in the storage unit.

By storing the calculated quality score, it is possible to retrieve in the future past calculation.

In an embodiment, the quality score for each of the classified Indicators of Compromise of the IP Address, Domain Name or URL type is recursively calculated at predetermined time interval.

The recursive calculation allows to modify the status of each Indicators of Compromise of the IP Address, Domain Name or URL type, by improving or deteriorating the related quality.

In an embodiment, the calculated quality score for each of the classified Indicators of Compromise of the IP Address, Domain Name or URL type is stored in the storage unit with a time reference of the calculation.

By storing the calculated quality score with a time reference of calculation, it is possible to analyze an improving or deteriorating quality over time.

In an embodiment, the method comprises the phase of assigning, by the computerized data processing unit, an IoC source score to each of the Indicators of Compromise after said phase of importing the Indicators of Compromise (IoC), wherein the IoC source score is based on a predefined range of values according to the source of the Indicators of Compromise, and
wherein the step of calculating the IP Address quality score performs the sum of the autonomous system score, subnet score, services hosted score and of the IoC source score.

In an embodiment, the method comprises the phase of assigning, by the computerized data processing unit, an IoC source score to each of the Indicators of Compromise after the phase of importing the Indicators of Compromise (IoC), wherein the IoC source score is based on a predefined range of values according to the source of the Indicators of Compromise, and
wherein the step of calculating said Domain Name quality score performs the sum of the registration data score, actual service hosted score, landing page Domain Name score, weighted IP Address quality score and of the IoC source score.

In an embodiment, the method comprises the phase of assigning, by the computerized data processing unit, an IoC source score to each of the Indicators of Compromise after the phase of importing the Indicators of Compromise (IoC), wherein the IoC source score is based on a predefined range of values according to the source of the Indicators of Compromise, and
wherein the step of calculating said URL quality score performs the sum of the landing page URL score, link score, weighted Domain Name quality score and of the IoC source score.

The calculation of an IoC source score allows to weight the quality of each Indicator of Compromise based on the reliability of the source of import of the same.

DETAILED DESCRIPTION OF THE INVENTION

The present invention relates to a method for assessing the quality of network-related indicators of compromise.

The method according to the present invention finds useful application with all the technology environments, including Information Technology (IT), Operation Technology (OT) and Internet of Things (IoT). The invention is applied in scenarios where is required an automated approach to process a large amount of data coming from untrusted sources as well as where the Quality Assurance process is needed to produce trusted results without relying only on the human interaction.

In particular, the present invention finds useful application in the field of security methods and security systems in the management of Indicators of Compromise.

The method, and the related system, will be described in the following taking as an example a single input Indicator of Compromise (IoC) of the URL type. The IoC to be evaluated is considered, as an example, the single data point "https://example.com/test/login.html".

According to the present invention is described, therefore, a method for assessing the quality of network-related Indicators of Compromise, in particular of the aforementioned URL.

The method for assessing the quality of network-related Indicators of Compromise starts with a phase of importing, by computerized data processing unit, one or more Indicators of Compromise (IoC). The computerized data processing unit is part of the system for assessing the quality of network-related Indicators of Compromise and can be a unit on a single machine or based on a distributed number of machines.

The phase of importing one or more IoC correspond to an ingestion of data to be subjected to evaluation according to a predefined set of values or thresholds, as detailed in the follows. In fact, the source providing the IoC cannot be always validated in advance and, due the large number of data to process, a manual validation is not an option in most of the cases.

Such a phase of importing one or more IoC can be carried our from several sources, such as external data feeds, which provide raw data points (IP addresses, Domain Names, URLs) with no additional content, or data points produced directly from the subject who needs the qualification according to the method of the invention. In the last case, the data points are produced in a defined context, for instance by running a malware sample within a sandbox, therefore with additional content to be managed.

Alike, the phase of importing may be carried out by importing the IoCs in batches or, as well, by single data point without changing the inventive concept.

In the present embodiment, it is supposed that the phase of importing has been carried out as an external data feed of a single data point reporting the aforementioned "https://example.com/test/login.html".

A further phase of classification, by the computerized data processing unit, is carried out to classify each of the Indicators of Compromise as IP Address, Domain Name or URL type. In this phase, the system is in charge to automatically recognize all the supported formats which includes IP Address, Domain Name and URL, defining classified Indicators of Compromise.

The term "IP Address" (Internet Protocol Address) means, in the present invention, a numerical label assigned to each device connected to a computer network that uses the Internet Protocol for communication. An IP Address serves two main functions: host or network interface identification and location addressing. Internet Protocol version 4 (IPv4) defines an IP address as a 32-bit number, however, because of the growth of the Internet and the depletion of available IPv4 addresses, a new version of IP (IPv6), using 128 bits for the IP address has been standardized.

The term "Domain Name" (Domain Name System—DNS) means, in the present invention, a hierarchical and decentralized naming system for computers, services, or other resources connected to the Internet or a private network. It associates various information with Domain Names assigned to each of the participating entities. Most prominently, it translates more readily memorized Domain Names to the numerical IP Addresses needed for locating and identifying computer services and devices with the underlying network protocols, providing a worldwide, distributed directory service.

The term "URL" (Uniform Resource Locator) means, in the present invention, a reference to a web resource that specifies its location on a computer network and a mechanism for retrieving it. A URL is a specific type of Uniform Resource Identifier (URI). URLs occur most commonly to reference web pages (http), but are also used for file transfer (ftp), email (mailto), database access (JDBC), and many other applications.

In the present embodiment, the phase of classification identifies the single data point as URL.

In further embodiment, the system may recognise every single data point, or batch data points, as Domain Name or as IP Address as well.

Subsequently, a phase of storing, in a storage unit of the permanent type operatively connected to the data processing unit, the classified Indicators of Compromise of IP Address, Domain Name or URL type is carried out. As described for the computerized data processing unit, the storage unit of the permanent type is part of the system for assessing the quality of network-related Indicators of Compromise and can be made by a single element on a single machine or based on a distributed number of machines, as well.

The same storage unit of the permanent type allows the storing of the quality scores for each of the classified Indicators of Compromise of the IP Address, Domain Name or URL type. In particular, such a further phase of storing, in the storage unit of the permanent type, the quality score of each of the classified Indicators of Compromise of the IP Address, Domain Name or URL type, follows the required phase of calculating, by the computerized data processing unit, a quality score for each of the classified Indicators of Compromise of the IP Address, Domain Name or URL type.

In the aforementioned phase of calculating a quality score, the system performs a data enrichment, wherein each type of Indicators of Compromise has specific data enrichment techniques that can be plugged/unplugged dynamically from the system itself. For instance, the IoC of the IP Address type can be enriched with data regarding the autonomous systems where a given IP Address resides, or the Domain Names pointing there, the IoC of the Domain Names type can be enriched by whois/rdap data to fetch registration date of a given domain as well as the registrar, name similarity with frequently phished on services, and the IoC of the URL type can be enriched with third party scanners data or structural similarity with frequently phished on login forms According to the imported data point of the URL type, the phase of calculating the quality score defines the calculation of a URL quality score with subsequent steps, which can be used for the calculation of any URL quality score for each of the Indicators of Compromise of the URL type. Likewise, taking into account the data point of the IP Address type or of the Domain Name type, the phase of calculating the quality score defines, respectively, the calculation of a IP Address quality score and of a Domain Name quality score.

The method according to the present invention allows, therefore, a qualification of the Indicators of Compromise of the URL type, based on the Domain Name identified from the URL itself, as well as from the IP Address identified from the same Domain Name, to assess the maliciousness according to a standard threshold.

The steps performed to accomplish the phase of calculating a quality score for the classified Indicators of Compromise of the URL type comprises a set of steps relating the Domain Name of the URL and a set of steps specifically designed for the URL itself, which sets are finally combined in the URL quality score.

The set of steps relating to the Domain Name comprises the step of identifying the Domain Name of the URL, the step of calculating the Domain Name quality score of the identified Domain Name as phase of calculating the quality score of the Indicators of Compromise of the Domain Name type and a step of calculating a weighted Domain Name quality score by weighting the Domain Name quality score with a predetermined Domain Name weight factor. Such steps will be described later in greater details.

The set of steps relating specifically to URL comprises, instead, the step of assigning a landing page URL score according to a predefined range of value based on comparison between the landing page of the URL and a database of spoofed web pages, the step of assigning a link score of the URL according to a predefined range of values based on comparison between the collection of outward links from the URL and a database of malware URLs and the step of calculating the URL quality score as sum of the landing page URL score, link score and of the weighted Domain Name quality score.

In the step of assigning a landing page URL score a structural analysis of the landing page is carried out, assigning a value over a predefined range of values, based on comparison between the landing page of the URL and a database of spoofed web pages. As an example, the value may be a selection of a discrete value in a predefined range of values which may vary between a minimum value, related to the minimum association with spoofed web pages, and a maximum value, related to the maximum association with spoofed web pages.

Therefore, a landing page with a popular login form spoofed has a positive score. In the example of the embodiment, by the structural analysis of the URL landing page, which is the page served when visiting the URL "https://example.com/test/login.html", fetch page content and compare against a corpus of known spoofed login web pages a value of +40 has been assigned to the landing page URL score since the page has the same structure of further URL.

In the step of assigning a link score an analysis of the landing page with malware scanners is carried out, assigning a value over a predefined range of values, based comparison between the collection of outward links from the URL and a database of malware URLs. As an example, the value may be a selection of a discrete value in a predefined range of values which may vary between a minimum value, related to the minimum collection of outward malware links, and a maximum value, related to the maximum collection of outward malware links.

Therefore, a landing page with malware links has a positive score. In the example of the embodiment, by the collection of the outwards links from the URL and the submission to a set of malware scanners, fetch the page relating to said outwards links collected, collect the all links and submit the list to a selected list of malware scanners a value of +20 has been assigned to the link score, since some scanners have a positive detection.

The step of calculating the URL quality score allows to make a single score as sum of the landing page URL score, link score and of the weighted Domain Name quality score. Being the landing page URL score and the link score already assigned, the remaining weighted Domain Name quality score need to be further calculated, in particular taking in mind that the method according to the invention scores the Domain Name of the URL as well the IP of the Domain Name itself.

To calculate the weighted Domain Name quality score, it is necessary to start from the assigning of the Domain Name quality score relating the Domain Name identified from the URL itself. The steps are the same as performed to accomplish the phase of calculating a quality score for the classified Indicators of Compromise of the Domain Name and comprises a set of steps relating the IP Address of the Domain Name and a set of steps specifically designed for the Domain Name itself, which sets are finally combined in the Domain Name quality score.

Therefore, the same steps herewith described are useful for the calculation of the Domain Name quality score to be weighted for the URL quality score, as well as for the phase of calculating the quality score of the Indicators of Compromise of the Domain Name type of each single data point of the Domain Name type for an imported IoC.

In particular, the weighted Domain Name quality score is calculated by weighting said Domain Name quality score with a predetermined Domain Name weight factor, which is predetermined and, for example, equal to 50%. Moreover, to arrive at the calculation of the weighted Domain Name quality score, first a step of identifying the Domain Name of the URL is carried out, followed by the step of calculating the Domain Name quality score of the identified Domain Name. According to the example of the URL "https://example.com/test/login.html", the step of identifying the Domain Name determined the associated Domain Name "example.com".

The set of steps relating to the IP Address comprises the step of identifying the IP Address of the Domain Name, the step of calculating the IP Address quality score of the identified IP Address as phase of calculating the quality score of the Indicators of Compromise of the IP Address type and a step of calculating a weighted IP Address quality score by weighting the IP Address quality score with a predetermined IP Address weight factor. Such steps will be described later in greater details.

The set of steps relating specifically to Domain Name comprises, instead, the step of assigning a registration data score of the Domain Name according to a predefined range of values based on the registration data, the step of assigning an actual service hosted score of the Domain Name according to a predefined range of values based on the rank of the service hosted by the Domain Name, the step of assigning a landing page Domain Name score according to a predefined range of value based on comparison between the landing page of the Domain Name and a database of spoofed web pages and the step of calculating the Domain Name quality score as sum of the registration data score, actual service hosted score, landing page Domain Name score and of the weighted IP Address quality score.

In the step of assigning a registration data score, the registration data of the Domain Name, as associated to the IoC of the URL type, is evaluated, assigning a value over a predefined range of values based on such registration data. As an example, the value may be a selection of a discrete value in a predefined range of values which may vary between a minimum value, related to a very old registration date, and a maximum value, related to a very recent registration date.

Therefore, a Domain Name registered for a long period of time with legitimate contact details has a negative score, while a very recent registration date with masked or fake contact details has a higher positive score. In the example of the embodiment, the extracted registration data reports a creation date on 2005 Oct. 5 and an updated date on 2010 Aug. 30, without taking into account the timestamp of the operations, therefore a value of −10 has been assigned to the registration data score since the domain has been registered long time ago, and last updated few years ago.

In the step of assigning an actual service hosted score an evaluation of the actual service hosted is carried out, assigning a value over a predefined range of values, based on the rank of the service hosted by the Domain Name. As an example, the value may be a selection of a discrete value in a predefined range of values which may vary between a minimum value, related to know website or service hosted, and a maximum value, related to unknow website or service hosted.

The service current hosted by the Domain Name "example.com" has a high popularity rank, therefore a value of −10 has been assigned to the actual service hosted score.

In the step of assigning a landing page Domain Name score a structural analysis of the landing page is carried out, assigning a value over a predefined range of values, based on comparison between the landing page of the Domain Name and a database of spoofed logins. As an example, the value may be a selection of a discrete value in a predefined range of values which may vary between a minimum value, related to the minimum association with spoofed web pages, and a maximum value, related to the maximum association with spoofed web pages.

Therefore, a landing page with a popular login form spoofed has a positive score. In the example of the embodiment, by the structural analysis of the Domain Name landing page, which is the page served when visiting the Domain Name "example.com", fetch page content and compare against a corpus of known spoofed login web pages a value of +0 has been assigned to the landing page Domain Name since no matches with known spoofed logins has been found.

The step of calculating the Domain Name quality score allows to make a single score as sum of the registration data score, actual service hosted score, landing page Domain Name score and of the weighted IP Address quality score. Being the registration data score, the actual service hosted score and the landing page Domain Name score already assigned, the remaining weighted IP Address quality score need to be further assigned, in particular taking in mind that the method according to the invention scores the IP Address of the Domain Name itself.

To calculate the weighted IP Address quality score, it is necessary to start from the assigning of the IP Address quality score relating the IP Address identified from the Domain Name itself. The steps are the same as performed to accomplish the phase of calculating a quality score for the classified Indicators of Compromise of the IP Address and comprises a set of steps specifically designed for the IP Address itself.

Therefore, the same steps herewith described are useful for the calculation of the IP Address quality score to be weighted for the Domain Name quality score, as well as for the phase of calculating the quality score of the Indicators of Compromise of the IP Address type of each single data point of the IP Address type for an imported IoC.

In particular, the weighted IP Address quality score is calculated by weighting said IP Address quality score with a predetermined IP Address weight factor, which is predetermined and, for example, equal to 50%. Moreover, to arrive at the calculation of the weighted IP Address quality score, first a step of identifying the IP Address of the Domain Name is carried out, followed by the step of calculating the IP Address quality score of the identified IP Address. According to the example of the Domain Name "example.com", the step of identifying the IP Address resolves the associated IP Address "80.180.32.23".

The steps relating to the IP Address comprises the step of identifying the IP Address of the Domain Name, the step of assigning an autonomous system score of the IP Address according to a predefined range of values based on a database of autonomous system owners, assigning a subnet score of the IP Address according to a predefined range of values based on a database of subnet owners, assigning a services hosted score of the IP Address according to a predefined range of values based on known malicious services hosted by the IP Address before the phase of calculating the quality score and the step of calculating the IP Address quality score as sum of the autonomous system score, subnet score and services hosted score.

In the step of assigning an autonomous system score, the autonomous system the IP Address belong to is evaluated, assigning a value over a predefined range of values based on a database of autonomous system owners. The value may be a selection of a discrete value in a predefined range of values which may vary between a minimum value, related to a known entity owner, and a maximum value, related to a malicious entity owner. As an example, an autonomous system that has a history of hosting malicious services has a positive score, while an autonomous system with a known trustworthy history has a negative score.

In the example of the embodiment, the extracted data of the autonomous system reports a known owner, which is considered not malicious, therefore a value of +0 has been assigned to the autonomous system score.

In the step of assigning a subnet score an evaluation of the legal entity that owns the subnet is carried out, assigning a value over a predefined range of values, based on a database of subnet owners. The value may be a selection of a discrete value in a predefined range of values which may vary between a minimum value, related to know subnet owner, and a maximum value, related to malicious subnet owner. As an example, a known trusted legal entity has a negative score, a legal entity with a history of hosting malicious services has a positive score, while a legal entity of a vps/service provider has a neutral score.

In the example of the embodiment, the extracted data of the subnet "80.180.0.0/16" reports a known owner, the same of the entity owner, therefore a value of +0 has been assigned to the subnet score.

In the step of assigning a services hosted score an analysis of the known malicious services hosted in the past by the same IP Address, assigning a value over a predefined range of values, based on known malicious services hosted. The value may be a selection of a discrete value in a predefined range of values which may vary between a minimum value, related to no malicious services hosted, and a maximum value, related to known malicious services hosted. As an example, if the IP Address is hosting a total of 10 domains and 1 domain contains malicious content, the IP Address will get a positive score towards being detected as malicious. In particular, an IP Address that hosts several legitimate/non malicious services/domains has a negative score, an IP Address that hosts several malicious services/domains has a positive score and an IP Address that doesn't host know services/domains has a positive score.

In the example of the embodiment, since no malicious services hosted have been found a value of +0 is assigned.

The step of calculating the IP Address quality score allows to make a single score as sum of the autonomous system score, subnet score and services hosted score.

Moreover, even if not necessary according to further embodiments, the present embodiment, the phase of calculating said quality score of the Indicators of Compromise of the IP Address type, further comprises the steps of retrieving the Domain Names hosted by the IP Address, assigning a registration data score to each of the retrieved Domain Name according to a predefined range of values based on the registration data, assigning an actual service hosted score to each of the retrieved Domain Name according to a predefined range of values based on the rank of the service hosted by the Domain Name, assigning a landing page score according to a predefined range of value based on comparison between the landing page of each of the retrieved Domain Name and a database of spoofed web pages and calculating a Base Domain Name quality score as sum of the registration data scores, actual service hosted scores and landing page scores.

The aforementioned steps up to the step of calculation of the Base Domain Name quality score are not described in further details since correspond, mutatis mutandis, to the steps before describe for the calculation of the Domain Name quality score. Anyway, in the example of the present invention the calculated value for the Base Domain Name quality score is considered +0.

Taking into account the score already calculated for evaluation of the IP Address, as identified from the Domain Name, as well the calculated Base Domain Name quality score, the step of calculating the IP Address quality score is performed as sum of the autonomous system score, subnet score, services hosted score and, of course, of the Base Domain Name quality score.

In this way, the IP Address quality score take into account also the quality of the Domain Names hosted by the IP Address. In particular, the method according to the present invention allows to identify the kind of Indicator of Compromise to be treated and allows a qualification of the same, based on the IP Address quality score, on the Domain Name quality score and on the URL quality score.

In particular, the evaluation of the IoC of the IP Address type is performed by simply calculating the IP Address quality score. Instead, the evaluation of the IoC of the Domain Name type is performed by calculating the Domain Name quality score and a weighted IP Address quality score based on the IP Address quality score of the identified IP Address relating to the Domain Name. Finally, the evaluation of the IoC of the URL type is performed by calculating the URL quality score and a weighted Domain Name quality score based on the Domain Name quality score of the identified Domain Name relating to the URL.

In the present example, the method according to the invention, by making use of the system described, calculates an IP address quality score equal to +0, a Domain Name quality score equal to −20 and a URL quality score equal to +50. In particular, the Domain Name quality score takes into account a weighted IP Address quality score already equal +0, while the URL quality score takes into account a weighted Domain Name quality score reduced from −20 to −10, according to the Domain Name weight factor already described.

Moreover, in the present embodiment, the method comprises the phase of assigning, by the computerized data processing unit, an IoC source score to each of the Indicators of Compromise after the phase of importing the Indicators of Compromise (IoC), wherein the IoC source score is based on a predefined range of values according to the source of the Indicators of Compromise.

For example, an IoC of the URL type extracted from a trusted feed of malicious IoC has a positive score, extracted from a binary detected as malware has a positive score and extracted from a binary considered benign has a negative score. An IoC of the Domain Name type extracted from a trusted feed of malicious IoC has a positive score, extracted from a binary detected as malware has a positive score and extracted from a binary considered benign has a negative score. Finally, an IoC of the IP Address type extracted from a trusted feed of malicious IoC has a positive score, extracted from a binary detected as malware has a positive score and extracted from a binary considered benign has a negative score.

Such a phase is not essential but, when carried out, modify also the calculation of the related quality score. In particular, the step of calculating said URL quality score performs the sum of the landing page URL score, link score, weighted Domain Name quality score and of the IoC source score, when the IoC score relates to the IoC of the URL type, the step of calculating the Domain Name quality score performs the sum of the autonomous system score, subnet score, services hosted score and of the IoC source score, when the IoC score relates to the IoC of the Domain Name type, while the step of calculating the IP Address quality score performs the sum of the autonomous system score, subnet score, services hosted score and of the IoC source score, when the IoC score relates to the IoC of the IP Address type.

The calculation of an IoC source score allows to weight the quality of each Indicator of Compromise based on the reliability of the source of import of the same.

According to the example of the present embodiment, an IoC of the URL type is assigned with a value equal to +10. Therefore, the corresponding URL quality score increases to a value equal to +60.

The value of the IoC source score is preferably selected from a predefined range of value based on database of trustworthy IoC feed.

To assess the quality of an IoC is necessary to evaluate the calculated quality score with a standard threshold. Therefore, after the calculation of the URL quality score, as described, a phase of evaluating, by the computerized data processing unit, the calculated quality score for each of the classified Indicators of Compromise of the IP Address, Domain Name or URL type is carried out.

Such a phase comprises, for each of the Indicators of Compromise of the URL type, the step of assessing the Indicators of Compromise of the URL type as malicious when the URL quality score exceed a predefined URL quality threshold.

As an example, the thresholds may comprise single values or ranges of values. In particular, according to the present embodiment a value lower +20 is considered in a range of-non malicious IoC, a value over +40 is considered malicious, while the range comprises between +20 and +40 is considered ambiguous. Therefore, on the basis of the corresponding URL quality score equal to +60 the imported IoC of the URL type is considered malicious.

Moreover, such a phase of evaluating the calculated quality score comprises, for each of the Indicators of Compromise of the Domain Name type, the step of assessing the Indicators of Compromise of the Domain Name type as malicious when the Domain Name quality score exceed a predefined Domain Name quality threshold. Finally, such a phase of evaluating the calculated quality score comprises, for each of the Indicators of Compromise of the IP Address type, the step of assessing the Indicators of Compromise of the IP Address type as malicious when the IP Address quality score exceed a predefined IP Address quality threshold.

The standard threshold and ranges may vary according to the tuning of the method and of the system. Moreover, differences between the quality score evaluation of the IoC of the IP Address, Domain Name or URL type may occur.

The final product of the method, and of the system as well, is a deliverable containing the malicious IoCs deployable to production systems. With this goal in mind the results of the evaluation phase are processed as follows: malicious data points (IoCs) are packaged into the deliverable, non-malicious data points (IoCs) are excluded from the deliverable and ambiguous data points (IoCs) populate a queue that will be processed manually by analysts.

Data points (IoCs) that entered the ambiguous data points queue when processed by an analyst will either become malicious or non-malicious within the system. When malicious they will be packaged into the next available deliverable slot.

The deliverable results are exposed through specific APIs that let the consumers of the deliverable-subscribe to receive a new batch of results as soon as they're available.

According to the present invention, the calculated quality score for each of the classified Indicators of Compromise of the IP Address, Domain Name or URL type is stored in the storage unit. By storing the calculated quality score, it is possible to retrieve in the future past calculation.

Moreover, according to the present invention, the quality score for each of the classified Indicators of Compromise of the IP Address, Domain Name or URL type is recursively calculated at predetermined time interval. The recursive calculation allows to modify the status of each Indicators of Compromise of the IP Address, Domain Name or URL type, by improving or deteriorating the related quality.

In particular, according to the present invention, the calculated quality score for each of the classified Indicators of Compromise of the IP Address, Domain Name or URL type is stored in the storage unit with a time reference of the calculation. By storing the calculated quality score with a time reference of calculation, it is possible to analyze an improving or deteriorating quality over time.

The method according to the invention defines, therefore, a modular, scalable and queryable system which ingests multiple network-related Indicators of Compromise, of the IP Addresses, Domain Names and URLs type, able to get decision whether the input of each Indicator of Compromise should be considered safe or malicious.

The system can be distributed on a scalable number of machines accepting queries regardless the number of the clients and integrates seamlessly with external systems such as continuous integration solutions.

The invention claimed is:

1. A method for assessing the quality of network-related Indicators of Compromise comprising the following phases:
   importing, by computerized data processing unit, one or more Indicators of Compromise;
   classification, by said computerized data processing unit, of each of said Indicators of Compromise as IP Address, Domain Name and URL type;
   storing, in a storage unit of the permanent type operatively connected to said data processing unit, said classified Indicators of Compromise of IP Address, Domain Name and URL type;
   calculating, by said computerized data processing unit, a quality score for each of said classified Indicators of Compromise of the IP Address, Domain Name and URL type;
   storing, in said storage unit of the permanent type, said quality score of each of said classified Indicators of Compromise of the IP Address, Domain Name and URL type;
   evaluating, by said computerized data processing unit, said calculated quality score for each of said classified Indicators of Compromise of the IP Address, Domain Name and URL type;
   wherein said phase of calculating said quality score comprises, for each of said Indicators of Compromise of the IP Address type, the following steps:
   assigning an autonomous system score of said IP Address according to a predefined range of values based on a database of autonomous system owners;
   assigning a subnet score of said IP Address according to a predefined range of values based on a database of subnet owners;
   assigning a services hosted score of said IP Address according to a predefined range of values based on known malicious services hosted by said IP Address before said phase of calculating said quality score;
   calculating said IP Address quality score as sum of said autonomous system score, subnet score and services hosted score; and
   wherein said phase of evaluating said calculated quality score comprises, for each of said Indicators of Compromise of the IP Address type, the step of assessing said Indicators of Compromise of the IP Address type as malicious when said IP Address quality score exceed a predefined IP Address quality threshold.

2. The method for assessing the quality of network-related Indicators of Compromise according to claim 1, wherein said phase of calculating said quality score of said Indicators of Compromise of the IP Address type, further comprises the following steps:

retrieving the Domain Names hosted by said IP Address;

assigning a registration data score to each of said retrieved Domain Name according to a predefined range of values based on the registration data;

assigning an actual service hosted score to each of said retrieved Domain Name according to a predefined range of values based on the rank of the service hosted by said Domain Name;

assigning a landing page score according to a predefined range of value based on comparison between the landing page of each of said retrieved Domain Name and a database of spoofed web pages;

calculating a Base Domain Name quality score as sum of said registration data scores, actual service hosted scores and landing page scores; and wherein said step of calculating said IP Address quality score is performed as sum of said autonomous system score, subnet score, services hosted score and Base Domain Name quality score.

3. The method for assessing the quality of network-related Indicators of Compromise according to claim 1, wherein said phase of calculating said quality score comprises, for each of said Indicators of Compromise of the Domain Name type, the following steps:

identifying the IP Address of said Domain Name;

calculating the IP Address quality score of said identified IP Address as phase of calculating said quality score of said Indicators of Compromise of the IP Address type;

calculating a weighted IP Address quality score by weighting said IP Address quality score with a predetermined IP Address weight factor;

assigning a registration data score of said Domain Name according to a predefined range of values based on the registration data;

assigning an actual service hosted score of said Domain Name according to a predefined range of values based on the rank of the service hosted by said Domain Name;

assigning a landing page Domain Name score according to a predefined range of value based on comparison between the landing page of said Domain Name and a database of spoofed web pages;

calculating said Domain Name quality score as sum of said registration data score, actual service hosted score, landing page Domain Name score and of said weighted IP Address quality score; and wherein said phase of evaluating said calculated quality score comprises, for each of said Indicators of Compromise of the Domain Name type, the step of assessing said Indicators of Compromise of the Domain Name type as malicious when said Domain Name quality score exceed a predefined Domain Name quality threshold.

4. The method for assessing the quality of network-related Indicators of Compromise according to claim 3, wherein said phase of calculating said quality score comprises, for each of said Indicators of Compromise of the URL type, the following steps:

identifying the Domain Name of said URL;

calculating the Domain Name quality score of said identified Domain Name as phase of calculating said quality score of said Indicators of Compromise of the Domain Name type;

calculating a weighted Domain Name quality score by weighting said Domain Name quality score with a predetermined Domain Name weight factor;

assigning a landing page URL score according to a predefined range of value based on comparison between the landing page of said URL and a database of spoofed web pages;

assigning a link score of said URL according to a predefined range of values based on comparison between the collection of outward links from said URL and a database of malware URLs;

calculating said URL quality score as sum of said landing page URL score, link score and of said weighted Domain Name quality score; and wherein said phase of evaluating said calculated quality score comprises, for each of said Indicators of Compromise of the URL type, the step of assessing said Indicators of Compromise of the URL type as malicious when said URL quality score exceed a predefined URL quality threshold.

5. The method for assessing the quality of network-related Indicators of Compromise according to claim 4, comprising the phase of assigning, by said computerized data processing unit, an IoC source score to each of said Indicators of Compromise after said phase of importing said Indicators of Compromise (IoC), wherein said IoC source score is based on a predefined range of values according to the source of said Indicators of Compromise, and wherein said step of calculating said URL quality score performs the sum of said landing page URL score, link score, weighted Domain Name quality score and of said IoC source score.

6. The method for assessing the quality of network-related Indicators of Compromise according to claim 3, comprising the phase of assigning, by said computerized data processing unit, an IoC source score to each of said Indicators of Compromise after said phase of importing said Indicators of Compromise (IoC), wherein said IoC source score is based on a predefined range of values according to the source of said Indicators of Compromise, and wherein said step of calculating said Domain Name quality score performs the sum of said registration data score, actual service hosted score, landing page Domain Name score, weighted IP Address quality score and of said IoC source score.

7. The method for assessing the quality of network-related Indicators of Compromise according to claim 1, wherein said calculated quality score for each of said classified Indicators of Compromise of the IP Address, Domain Name or URL type is stored in said storage unit.

8. The method for assessing the quality of network-related Indicators of Compromise according to claim 1, wherein said quality score for each of said classified Indicators of Compromise of the IP Address, Domain Name or URL type is recursively calculated at predetermined time interval.

9. The method for assessing the quality of network-related Indicators of Compromise according to claim 8, wherein said calculated quality score for each of said classified Indicators of Compromise of the IP Address, Domain Name or URL type is stored in said storage unit with a time reference of said calculation.

10. The method for assessing the quality of network-related Indicators of Compromise according to claim 1, comprising the phase of assigning, by said computerized data processing unit, an IoC source score to each of said Indicators of Compromise after said phase of importing said Indicators of Compromise (IoC),

- wherein said IoC source score is based on a predefined range of values according to the source of said Indicators of Compromise, and
- wherein said step of calculating said IP Address quality score performs the sum of said autonomous system score, subnet score, services hosted score and of said IoC source score.

* * * * *